(12) United States Patent
Takayanagi

(10) Patent No.: US 7,044,505 B2
(45) Date of Patent: May 16, 2006

(54) QUICK CONNECTOR WITH FUNCTION OF VERIFYING COMPLETE CONNECTION

(75) Inventor: Akira Takayanagi, Aichi-ken (JP)

(73) Assignee: Tokai Rubber Industries, Ltd., (JP)

( * ) Notice: Subject to any disclaimer, the term of this patent is extended or adjusted under 35 U.S.C. 154(b) by 72 days.

(21) Appl. No.: 10/442,513

(22) Filed: May 21, 2003

(65) Prior Publication Data

US 2003/0218335 A1 Nov. 27, 2003

(30) Foreign Application Priority Data

May 23, 2002 (JP) ............................. 2002-149177

(51) Int. Cl.
*F16L 35/00* (2006.01)

(52) U.S. Cl. ........................................ 285/93; 285/319

(58) Field of Classification Search ................ 285/305, 285/319, 93
See application file for complete search history.

(56) References Cited

U.S. PATENT DOCUMENTS

| | | | | |
|---|---|---|---|---|
| 4,946,205 A | * | 8/1990 | Washizu | ...................... 285/319 |
| 5,152,555 A | * | 10/1992 | Szabo | .......................... 285/93 |
| 5,342,099 A | * | 8/1994 | Bahner et al. | ................. 285/93 |
| 5,441,313 A | * | 8/1995 | Kalahasthy | ................... 285/93 |
| 5,542,712 A | * | 8/1996 | Klinger et al. | ................ 285/93 |
| D398,819 S | * | 9/1998 | Kondou | ....................... 285/305 |
| 5,855,398 A | * | 1/1999 | Reinholz | ....................... 285/93 |
| 5,897,145 A | * | 4/1999 | Kondo et al. | .................. 285/93 |
| 6,129,393 A | | 10/2000 | Kodama et al. | |
| 6,145,886 A | * | 11/2000 | Ohta et al. | ..................... 285/93 |
| 6,328,344 B1 | * | 12/2001 | Tozaki et al. | .................. 285/93 |

FOREIGN PATENT DOCUMENTS

EP        0 846 907         4/2004

* cited by examiner

*Primary Examiner*—David Bochna
(74) *Attorney, Agent, or Firm*—Andrus, Sceales, Starke & Sawall, LLP

(57) ABSTRACT

A quick connector is configured as such that one axial end of an engagement window is co-planar with an annular end surface inside of a retainer holding portion. A checker jut toward an axial direction is provided integrally on a base portion of an inwardly directed engagement portion of a checker. The checker is mounted on the connector housing so that the checker jut toward one axial direction abuts the one axial end of the engagement window.

3 Claims, 15 Drawing Sheets

US 7,044,505 B2

QUICK CONNECTOR WITH FUNCTION OF VERIFYING COMPLETE CONNECTION

CROSS REFERENCE TO RELATED APPLICATION

The present application claims priority from Japanese Patent Application No. 2002-149177 (149177/2002), filed May 23, 2002.

BACKGROUND OF THE INVENTION

The present invention relates to a quick connector having a function to verify that a pipe is correctly connected to the quick connector in snap-engagement relation, for example, adapted in assembly in a gasoline fuel piping of an automobile.

In a fluid piping structure, for example, a gasoline fuel piping structure where a tube is joined to a pipe, a connector is used for joining the tube to the pipe. In such piping system, for example, a pipe includes an inserting end portion on one axial side thereof wherein an annular engagement projection is formed on and around an outer peripheral surface. Then, the inserting end portion of the pipe is inserted and fitted in the connector so that the annular engagement projection snap-engages with the connector to provide locking relation between the pipe and the connector, thereby connection between the pipe and the connector is completed. A quick connector adapted in this manner comprises a tubular connector housing provided with a tube connecting portion on one axial side thereof and an annular or generally annular retainer. The connector housing also has a retainer holding portion on an opposite axial side thereof, wherein at least one engagement window, for example, a pair of engagement windows are provided in diametrically opposed relation with one another. The retainer has a pipe engagement portion on one axial end portion thereof which is configured so as to be snap-engaged with the annular engagement projection of the pipe, and is fitted in the retainer holding portion to engage with the engagement window. That is, the pipe is inserted in the retainer so that the annular engagement projection of the inserting end portion snap-engages with the retainer. And thereby the pipe is fitted in and connected to the quick connector. The pipe engagement portion is configured mostly in engagement slit formed to extend circumferentially of the retainer on one axial end portion thereof. By the way, in such connecting structure, if an operator does not take care sufficiently to complete connection between the pipe and the connector, the inserting end portion of the pipe might not be fully inserted into the retainer or the connector and the annular engagement projection of the pipe might not snap-engage with the retainer. Thus, the pipe might be in so-called half-fitting relation with respect to the connector. In case of a piping system subject to operation while the pipe is incompletely connected to the connector, as sealing property by a sealing member between the connector and the pipe is insufficient or becomes insufficient, an inner fluid usually leaks out.

Then, for example, as disclosed in JP, A, 11-344182, in order to easily verify complete connection of a pipe to a quick connector, a checker is adapted to provide the connector with a function of verifying complete connection. The checker for verifying complete connection usually has a checker body configured to have inner surface curing along or generally along an outer peripheral surface of a connector housing, and a pair of engagement portions. The checker body is provided with a pull-out portion. The engagement portion is formed integrally on the checker body, more specifically, on opposite ends or opposite end portions respectively of the checker body. The checker is fitted on an outer periphery of the connector housing between engagement windows wherein the engagement portions of the checker snap-engage with one circumferential ends of the engagement windows respectively to restrain movement of the checker in a pull-out direction, with an inner end portion of the engagement portion seating in the engagement slit of the retainer. The checker is configured to be allowable for being pulled out by release of snap-engagement between the engagement portion and the engagement window as a result of the engagement portion deflecting and moving radially outwardly, being pressed by the annular engagement projection, when the pipe is correctly fitted in the connector and the annular engagement projection of the inserting end portion fits in and snap-engages with the engagement slit of the retainer. Accordingly, upon completion of connection work of the pipe and the quick connector, it can be verified that the pipe is completely connected in the quick connector by pulling the checker out of the connector housing with the pull-out portion in a direction perpendicular to an axial direction of the connector housing. If the checker cannot be removed out of the connector housing when the checker is pulled, mostly the pipe is not completely connected to the quick connector. In such case, connection work of the pipe and the quick connector should be again implemented so that the inserting end portion of the pipe is fully inserted in the quick connector.

Meanwhile, the annular engagement projection of the pipe presses the engagement portion of the checker toward a radially outward direction in one axial direction to cause deformation and movement thereof. Accordingly, in such structure as allow the engagement portion of the checker to displace in one axial direction, the engagement portion may be limited to move smoothly radially outwardly when pressed by the annular engagement projection. Then it is fear that the pipe cannot be often correctly connected to the quick connector or pipe connecting work is often ended in spite of incomplete fitting relation between the pipe and the connector. In order to solve this problem, the quick connector may be configured as such that an annular end surface, which is defined on one axial end of the inside of the retainer holding portion or on the border between the inside of the retainer holding portion and the inside of a portion to receive a part of the pipe extruded from the retainer, is located on one axial side from one axial end of the engagement window. And a retainer fitting structure is thereby configured so that one axial end of the retainer contacts with or is located adjacent to the annular end surface and the engagement slit is located in an axial position generally corresponding to one axial end of the engagement window. Then, when the checker is fitted on the connector housing so that the engagement portion of the checker is located axially generally corresponding to the engagement slit of the retainer, the engagement portion of the checker is in contact relation with one axial end of the engagement window, and ceases to be displaced toward one axial direction when pressed by the annular engagement projection of the pipe. Therefore, the engagement portions are assured of being deformed smoothly in an opening direction or in a releasing direction at insertion of the pipe.

However, if the annular end surface on one axial side of the inside of the retainer holding portion is defined on one axial side from one axial end of the engagement window, a step is defined between the annular end surface and one axial end of the engagement window. Consequently, when the pipe is inserted, a groove is defined between the step and the pipe and water remains therein. In case of a metallic pipe, the pipe may be rusted and corroded due to water remaining in the groove. Especially in the case that the connector housing is disposed upright in a direction longitudinally thereof, with an insertion opening or an opposite axial end opening upward and a tube connecting portion downward in fuel piping or any other piping of vehicles, a relatively large amount of water is likely to migrate from outside and remain in the groove, it may eventually cause corrosion of the metallic pipe at an early date.

In order to ensure draining performance of a quick connector to prevent a metallic pipe from corrosion, it is preferred that the annular end surface on one axial side of the inside of the retainer holding portion is defined on an axial position corresponding to one axial end of the engagement window so that no step is defined therebetween. However, in this structure, one axial end of the retainer cannot be located on one axial side from one axial end of the engagement window, and the engagement slit is accordingly located on an opposite axial side from one axial end of the engagement window. Therefore, when the checker is fitted on the connector housing so that the engagement portion of the checker is located in an axial position generally corresponding to the engagement slit of the retainer, a gap is defined between the engagement portion and one axial end of the engagement window. In this arrangement, the engagement portions are apt to be displaced in one axial direction and cannot be deformed smoothly an opening direction when pressed by the annular engagement projection of the pipe. As a result, it is a fear that a pipe connecting work is disturbed.

Accordingly, it is an object of the present invention to provide a quick connector with function of verifying complete connection which has an excellent draining performance and is configured so that an engagement portion of a checker is smoothly deformed in an opening direction when a pipe is connected to the quick connector.

SUMMARY OF THE INVENTION

In order to achieve a foregoing object, there is provided a novel quick connector to be connected with a pipe which has an inserting end portion formed with an annular engagement projection, for example, on one axial side thereof and having a function to verify complete connection with the pipe.

The quick connector has a tubular connector housing. The tubular connector housing is provided with a tube connecting portion to be connected with a tube (including a hose or the like) on one axial side thereof or one side on a direction of an axis of the quick connector or the connector housing, and a retainer holding portion having at least one engagement window, for example, a pair of engagement window in opposed relation with one another on an opposite axial side thereof or an opposite side in a direction of an axis of the quick connector or the connector housing. The quick connector also has an annular or generally annular retainer. The retainer is provided with a pipe engagement portion so as to be snap-engaged with the annular engagement projection of the pipe, for example, when the inserting end portion of the pipe is inserted in the connector housing, and fitted to the retainer holding portion to engage with the engagement window (including a portion surrounding the engagement window). The quick connector further has a checker. The checker has a checker body configured so as to be along or generally along an outer peripheral surface of the connector housing or so as to include an inner surface curving or being along or generally along an outer peripheral surface of the connector housing, for example, an outer peripheral surface between a pair of the engagement windows, and at least one engagement portion. The checker body is provided with a pull-out portion. The engagement portion is formed integrally on the checker body, for example, on opposite ends or opposite end portions thereof respectively. The checker is fitted or mounted on an outer periphery or an outer peripheral surface of the connector housing, being locked in a pull-out direction by engagement, for example, snap-engagement between the engagement portion and the engagement window (including a portion surrounding the engagement window). The engagement portion of the checker is configured so as to be pushed by the annular engagement projection of the pipe and thereby deformed and moved to allow the checker to be pulled out when engagement, for example, snap-engagement between the annular engagement projection and the pipe engagement portion of the retainer brings about complete connection between the pipe and the quick connector. Typically, the retainer is fitted in the retainer holding portion so that the pipe engagement portion is located on an opposite axial side from one axial end (namely, one end in an axial direction of the quick connector, the connector housing or the retainer holding portion) of the engagement window and is shown in the engagement window. The checker is fitted or mounted on the connector housing so that the engagement portion of the checker seats in the engagement window, in an axial position corresponding to the pipe engagement portion of the retainer. Further, inclining preventive means is provided between the engagement portion of the checker and one axial end of the engagement window to prevent the engagement portion form inclining in one axial direction (namely, in one axial direction of the quick connector, the connector housing or the retainer holding portion). The inclining preventive means include any means to prevent the engagement portion from moving or displacing in one axial direction. As the engagement portion of the checker is prevented from moving or displacing in one axial direction by the inclining preventive means when pressed by the annular engagement projection of the pipe, the engagement portion is smoothly deformed and moved radially outwardly.

For the quick connector with function of verifying complete connection according to the present invention, for example, applied is a retainer wherein a pipe engagement portion is formed on an opposite axial side (namely, an opposite side in an axial direction of the quick connector, the connector housing or the retainer holding portion) from one axial end (namely, one end in an axial direction of the quick connector, the connector housing or the retainer holding portion) of the retainer, and is to be located on an opposite axial side from one axial end of the engagement window. And also, for example, applied is a connector housing wherein an annular end surface on one axial side of the inside of a retainer holding portion, which one axial end of the retainer contacts with or is located adjacent to, is in an axial position corresponding to one axial end of the engagement window. In this instance, no step is defined between the annular end surface and one axial end of the engagement window, and the retainer is fitted in the retainer holding portion so that the pipe engagement portion is located on an opposite axial side from one axial end of the engagement window and is shown in the engagement window. The pipe engagement portion of the retainer may be configured in an engagement slit or engagement slits extending circumferentially on one axial end portion of the retainer.

The checker is fitted on the connector housing so that engagement portion is located in an axial position corresponding to the pipe engagement portion of the retainer, i.e., in an axial position corresponding to the annular engagement projection of the pipe in engagement relation with the pipe engagement portion. In case that the pipe engagement portion of the retainer is configured in an engagement slit or engagement slits extending circumferentially on one axial end portion thereof, the checker is fitted or mounted on the connector housing so that the engagement portion is located in an axial position corresponding to the engagement slit, and specifically an radially inner end of the engagement portion enters in the retainer holding portion, more specifically in the engagement slit through the engagement window. In this way, the engagement portion of the checker is located on an opposite axial side from one axial end of the engagement window, corresponding to an axial position of the pipe engagement portion of the retainer.

Inclining preventive means may be configured in checker protrusion or checker jut toward an axial direction (namely, toward an axial direction of the quick connector, the connector housing or the retainer holding portion) or toward one axial direction (namely, toward one side in an axial direction of the quick connector, the connector housing or the retainer holding portion) formed or provided integrally on the engagement portion of the checker. The checker jut toward an axial direction or one axial direction is configured so that a tip end portion thereof is, for example, in contact relation with one axial end of the engagement window, when the checker is fitted or mounted on the connector housing. With thus configured inclining preventive means, there is no need to provide an inclining preventive structure with the connector housing additionally. Therefore, one axial end of the engagement window and the annular end surface may be configured to define a flat continuous plane without jut.

Alternatively, inclining preventive means may be configured in window protrusion or window jut toward an opposite axial direction (namely, toward an opposite side in an axial direction of the quick connector or the connector housing), formed or provided integrally on one axial end of the engagement window of the connector housing. The window jut toward an opposite axial direction is configured so that a tip end portion is, for example, in contact relation with the engagement portion of the checker, when the checker is fitted or mounted on the connector housing.

A quick connector with function of verifying complete connection of present invention has a structure not to trouble a pipe connecting work, although a checker is mounted on a connector housing so that space or gap is defined between an engagement portion or an inwardly directed engagement portion of the checker and one axial end of the engagement window.

Now, the preferred embodiments of the present invention will be described in detail with reference to the drawings.

DETAILED DESCRIPTION OF THE PREFERRED EMBODIMENTS

Figure 1:
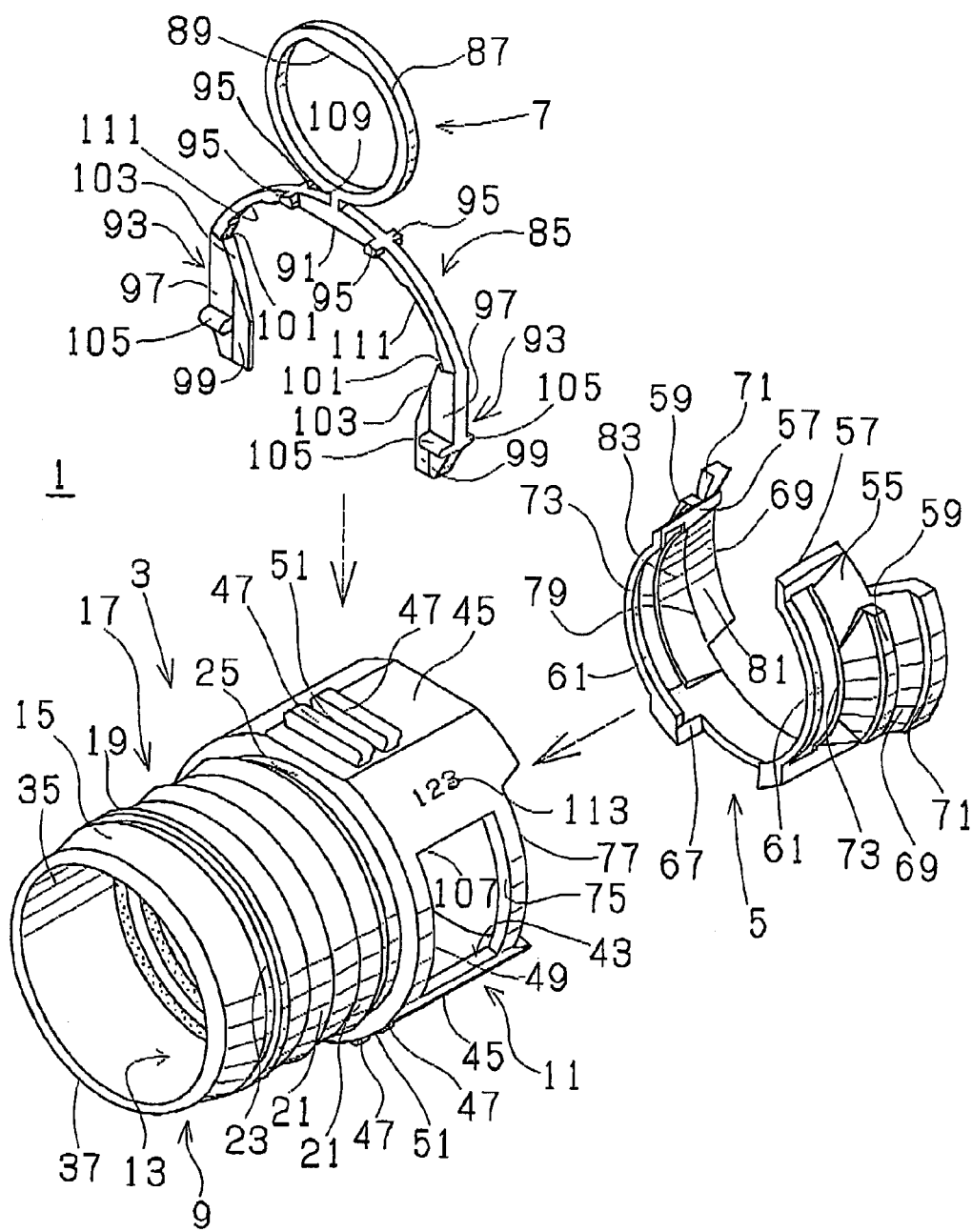
FIG. 1 is a perspective exploded view of a quick connector according to the present invention.

A quick connector 1 with function of verifying complete connection, which is adapted for assembly in a gasoline fuel piping of an automobile, as shown in FIG. 1, comprises a tubular connector housing 3, a generally annular retainer 5 and a checker 7 for verifying complete connection between a pipe and the quick connector 1 itself.

Figure 4:
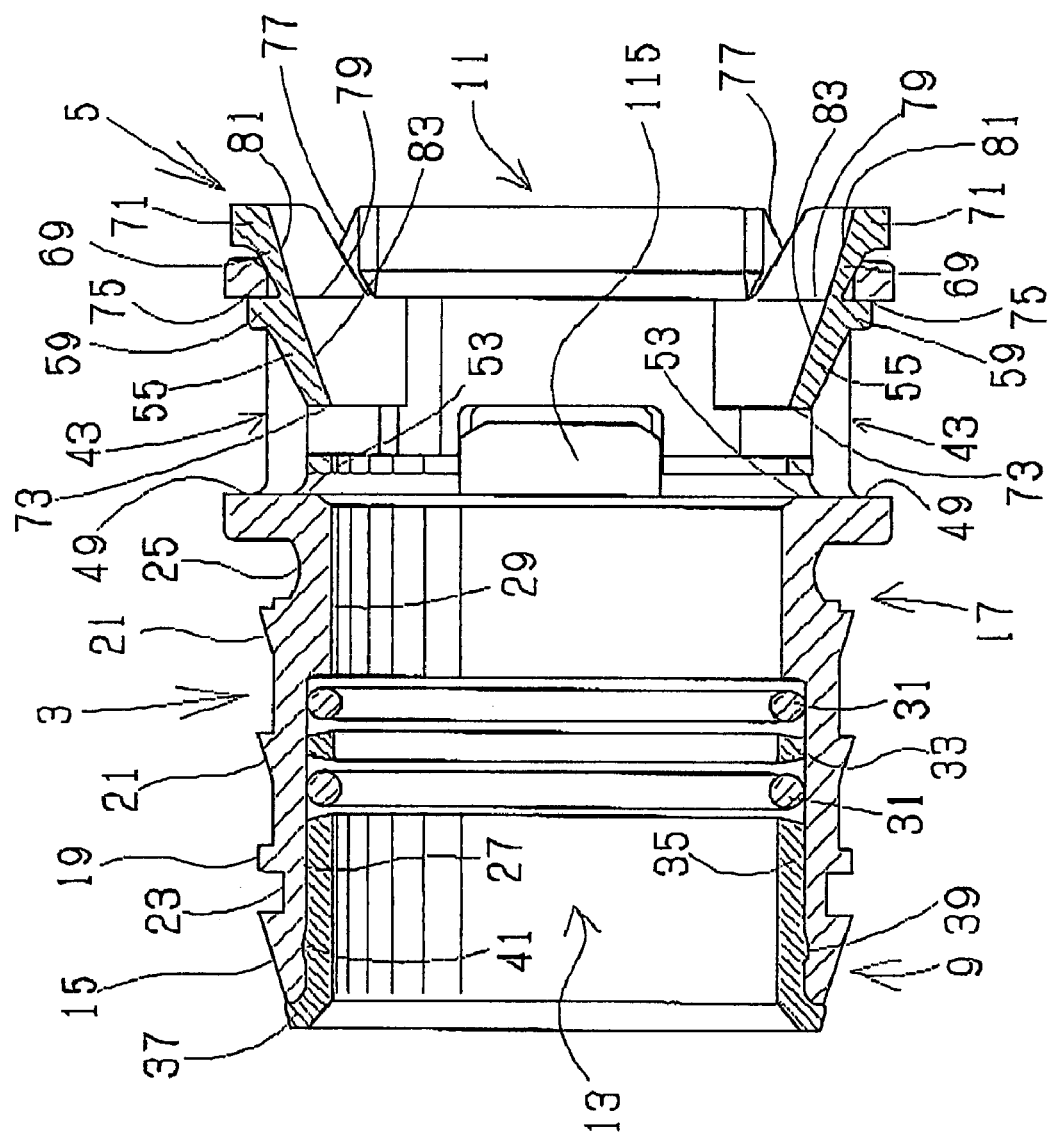
FIG. 4 is a sectional view taken in an axial direction of a retainer fitted in a connector housing.

As well shown in FIGS. 1 and 4, the connector housing 3 made of glass fiber reinforced polyamide (PA·GF), integrally comprises a cylindrical resin tube connecting portion 9 on one axial side thereof and a generally cylindrical retainer holding portion 11 on an opposite axial side thereof, and is provided with a through-bore 13 through from one axial end to an opposite axial end thereof. The resin tube connecting portion 9 comprises one axial side portion 15 of right-angle triangle in cross-section having an outer peripheral surface expanding gently in diameter toward an opposite axial side, and an opposite axial side portion 17 having an outer peripheral surface extending like a simple cylindrical shape on an opposite axial side from the one axial side portion 15. The opposite axial side portion 17 is provided on an outer peripheral surface with an annular projecting stop portion 19 of rectangular in cross-section and two annular projecting stop portions 21, 21 of right-angle triangle in cross-section expanding in diameter toward an opposite axial side. The annular projecting stop portion 19 and the annular projecting stop portions 21, 21 are arranged in axially spaced relation sequentially from one axial side to an opposite axial side. A resin tube (not shown), for example, a resin pipe member is tightly fitted on and connected to an outer periphery or an outer peripheral surface of the resin tube connecting portion 9. A rubber hose or a SUS pipe member may be also adapted for member to be connected with a tube connecting portion of a quick connector of the present invention. An outer peripheral surface 23 on one axial end portion of the opposite axial side portion 17, namely a portion between the one axial side portion 15 and the annular projecting stop portion 19 is formed in small diameter or in deep annular groove, while an outer peripheral surface 25 on the opposite axial end portion thereof, namely a portion from an opposite axial side slightly from the annular projecting stop portion 21 of an opposite axial side to the retainer holding portion 11, is formed in smaller diameter or in deeper grove compared to the outer peripheral surface 23 on one axial end portion thereof. An O-ring for sealing is fitted around the outer peripheral surface 23 on one axial end portion of the opposite axial side portion 17 to provide a sealing between the resin tube connecting portion 9 and the resin tube.

As well shown in FIG. 4, an inner peripheral surface of the resin tube connecting portion 9 comprises a large diameter portion 27 on one axial side thereof and a small diameter portion 29 on an opposite axial side thereof. Within the large diameter portion 27, a pair of O-rings 31, 31 are fitted axially in side by side relation with intervening a collar 33 therebetween on an opposite axial side thereof, and a resin bush 35 is fitted on one axial side thereof. The resin bush 35 is formed generally in a cylindrical shape, and has integrally an annular engagement portion 37 on one axial end portion thereof. The resin bush 35 is provided with a low annular projection 39 on an outer peripheral surface near one axial end thereof. The annular engagement portion 37 is formed so as to project somewhat radially outwardly. The resin bush 35 has an inner diameter substantially identical to an inner diameter of the small diameter portion 29, and is fitted in the large diameter portion 27 so that the annular projection 39 seats in a shallow annular groove 41 formed near one axial end of the large diameter portion 27 and the annular engagement portion 37 engages with one axial end portion of the resin tube connecting portion 9. The O-rings 31, 31 are axially maintained in a space between the resin bush 35 and a stepped surface or radial surface between the small diameter portion 29 and the large diameter portion 27.

Figure 5:
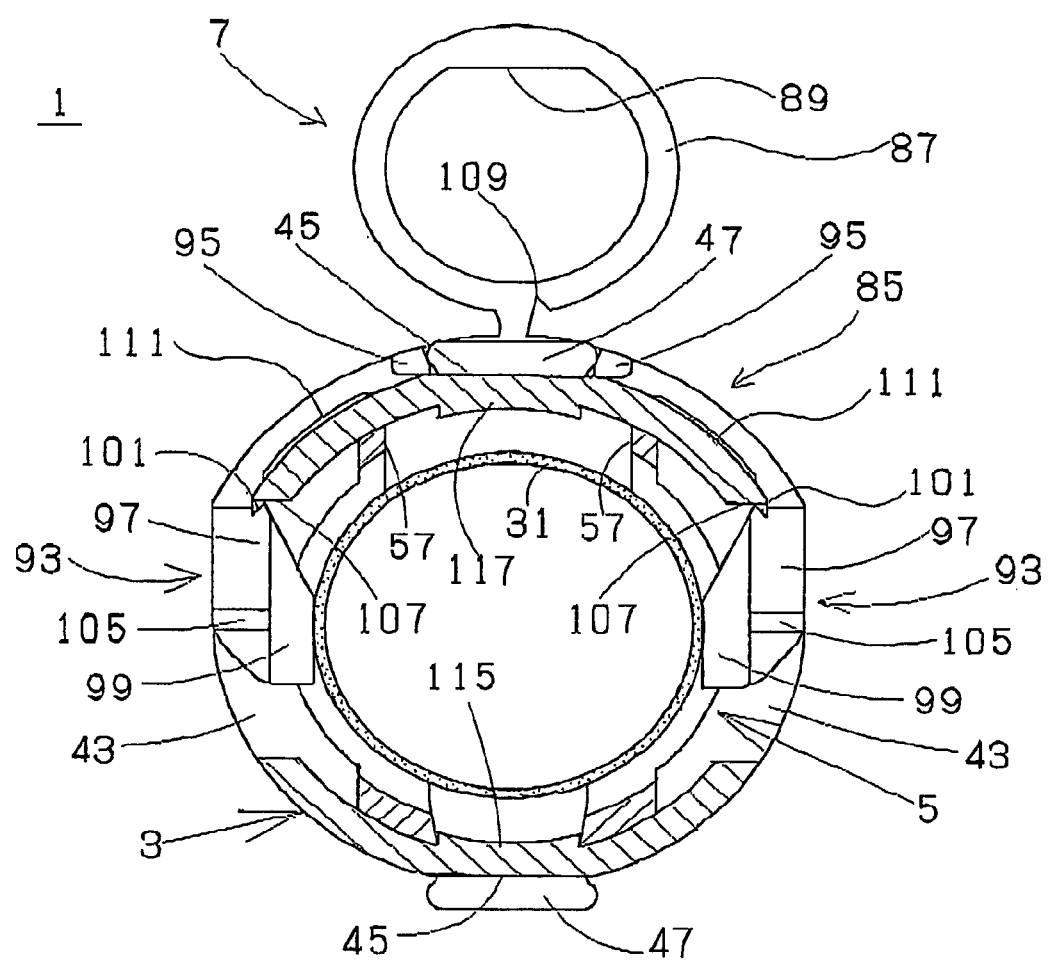
FIG. 5 is a sectional view taken in a radial direction of the quick connector according to the present invention.

As well shown in FIGS. 1, 4 and 5, the generally cylindrical retainer holding portion 11 of a larger diameter than the resin tube connecting portion 9, is provided with engagement windows 43, 43 of uniform configuration in diametrically symmetrical positions and in opposed relation with one another, and flat regions 45, 45 of uniform shape on outer peripheral surfaces respectively between the engagement windows 43, 43 in diametrically symmetrical positions. The flat region 45 extends entire axial length of the retainer holding portion 11 with width or a circumferential length of substantially one third of an outer diameter of the retainer holding portion 11. Two elongate ribs 47, 47 of uniform shape are formed on one flat region 45 and the other flat region 45 respectively on one axial side thereof. The elongate ribs 47, 47 are located parallel with one another, in axially slightly spaced relation with one another. Each elongate rib 47 extends circumferentially generally the entire width, or nearly from one circumferential end nearly to the other circumferential end of the flat region 45. The elongate rib 47 of one axial side is located toward an opposite axial side compared to one axial ends 49, 49 of the engagement windows 43, 43, and thereby a fit-in slot or an axial space 51 defined by the elongate ribs 47, 47 is located somewhat toward an opposite axial side compared to the one axial ends 49, 49 of the engagement windows 43, 43. The retainer holding portion 11 is internally provided with a narrow annular end surface 53 expanding radially inwardly on one axial end. The annular end surface 53 is coplanar with the one axial ends or the one axial end surfaces 49, 49 of the engagement windows 43, 43. That is, no step or no stepped portion exists between the one axial ends 49, 49 of the engagement windows 43, 43 and the annular end surface 53.

As well shown in FIGS. 1 and 4, the retainer 5 made of PA is fitted in the retainer holding portion 11. This retainer 5 is relatively flexible, and is formed so as to be resiliently deformable. The retainer 5 has a main body 55 of C-shape in cross-section, namely generally annular shape wherein a relatively large space for deformation is defined between circumferential opposite end portions 57, 57 thereof. The main body 55 is provided with a pair of engagement tabs 59, 59 projecting radially outwardly in diametrically symmetrical positions of an opposite axial end portion thereof. Each engagement tab 59 is uniform in shape. An inner surface of the main body 55, except a portion diametrically opposed to the space for deformation, is tapered generally in the direction toward one axial side thereof so as to reduce gradually an inner diameter thereof. And, apart from a portion diametrically opposed to the space for deformation, one axial end portion 61 of the main body 55 is formed with an inner diameter almost identical to a pipe (refer to a reference numeral 63 in FIG. 10), and smaller than an annular engagement projection (refer to a reference numeral 65 in FIG. 10). The portion diametrically opposed to the space for deformation of the main body 55 has an inner surface like a portion of a cylindrical inner surface shape, and the main body 55 is formed with an indent 67 on one axial end portion of the portion diametrically opposed to the space for deformation.

A pair of operation arms 69, 69 are formed integrally on an opposite axial end portion of the main body 55 of the retainer 5 so as to extend inclining radially outwardly in an opposite axial direction from respective circumferential positions corresponding to the engagement tabs 59, 59. The operation arm 69 respectively, has a latching end 71 projecting radially outwardly on an opposite axial end portion thereof. The one axial end portion 61 of the main body 55 is provided with engagement slits 73, 73 (pipe engagement portion) extending circumferentially in opposed relation with one another. Thus configured retainer 5 is inserted and fitted in the retainer holding portion 11 from an opening on the opposite axial end thereof, so that the engagement tabs 59, 59 seat in the engagement windows 43, 43 of the retainer holding portion 11 in engagement or engageable relation with opposite axial ends 75, 75 of the engagement windows 43, 43 and that the latching ends 71, 71 seat in a pair of receiving recessed portions 77, 77 of the retainer holding portion 11 in engagement relation therewith. The receiving recessed portions 77, 77 are formed on an opposite axial end portion of the retainer holding portion 11 at respective circumferential position corresponding to the engagement windows 43, 43 so as to receive the latching ends 71, 71 of the operation arms 69, 69. Thereby it is prevented that the retainer 5 moves from its correct fitting position in the retainer holding portion 11, when the latching end 71 is just touched carelessly by an operator. Such construction also renders it difficult to exert an external force on the latching end 71, and consequently on the retainer 5. Opposed inner surfaces 79, 79 of the retainer 5 with arcuate shape in cross-section which are extending respectively from the operation arms 69, 69 to the engagement slits 73, 73 are generally tapered respectively in a direction of one axial side toward the center or the central axis of the retainer 5. Each of the tapered inner surfaces 79, 79 of the retainer 5 comprises a tapered inner surface 81 of the operation arm 69 and a tapered inner surface 83 of the main body 55. The opposed inner surfaces 83, 83 of the main body 55 are tapered respectively at somewhat smaller angle or somewhat gently than the inner surfaces 81, 81 of the operation arms 69, 69. And then the retainer 5 is configured so that the annular engagement projection 65 of the pipe 63 necessarily or substantially necessarily abuts the opposite axial ends of the opposite tapered inner surfaces 83, 83 of the main body 55 when the pipe 63 is inserted in the main body 55 of the retainer 5 from the side of the latching ends 71, 71 of the operation arms 69, 69. That is, the annular engagement projection 65 of the pipe 63 abuts the tapered inner surfaces 79, 79 of the retainer 5 at a boundary between the operation arms 69, 69 and the main body 55 at insertion of the pipe 63.

Figure 2:
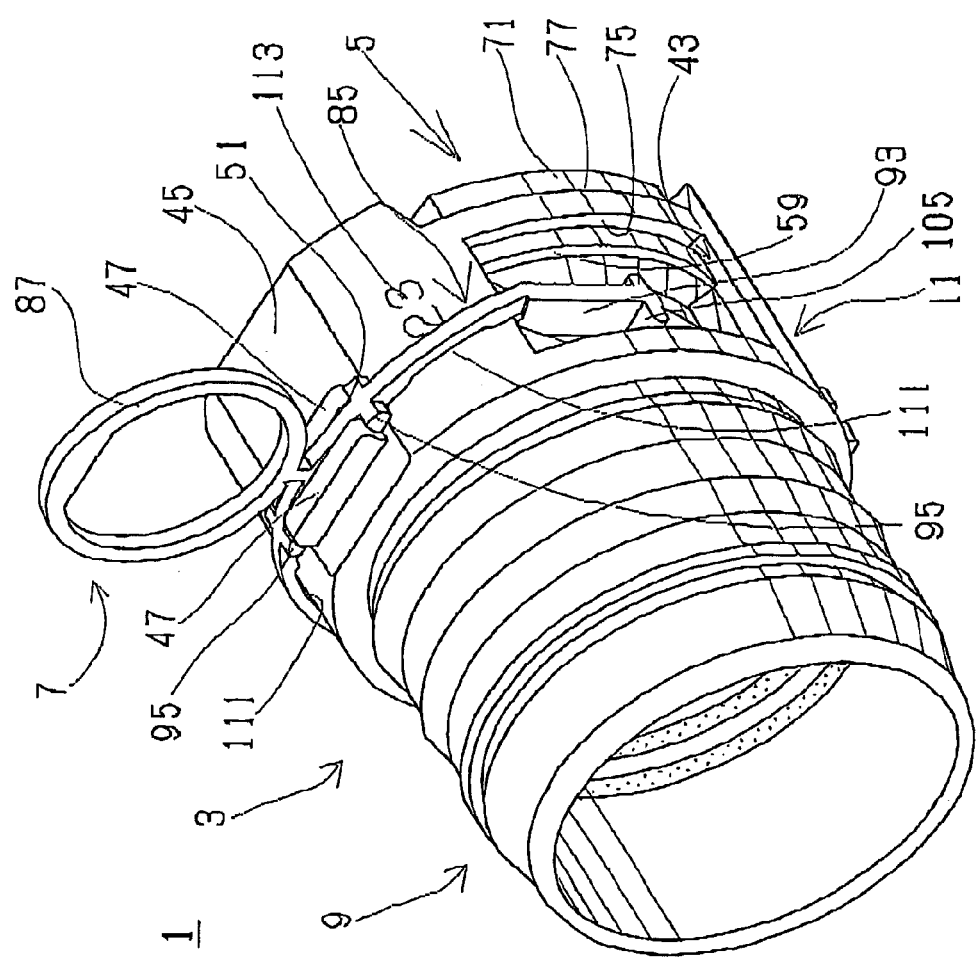
FIG. 2 is an assembled view of the quick connector according to the present invention.

As well shown in FIGS. 1, 2, and 5, the checker 7 is fitted on an outer periphery or an outer peripheral surface of the connector housing 3. The checker 7 is made of polyacetal (POM) and is formed relatively flexible, and resiliently deformable. The checker 7 has a thin-walled checker body 85 curving along an arc of a diameter generally identical to an outer peripheral surface of the connector housing 3. The checker body 85 is provided integrally with a pull-ring 87 (pull-out portion) having a flat fingerhold portion (straight portion) 89 at a portion of an inner peripheral surface thereof on an opposite side of the checker body 85, at the widthwise center part of an outer portion or outer peripheral portion thereof. Further, the checker body 85 is formed with a flat portion (straight portion) 91 at the widthwise center part on an inner surface or inner peripheral surface thereof, of which length is substantially identical to the width of the flat region 45 of the connector hosing 3. Inwardly directed engagement portions 93, 93 projecting in a widthwise inward direction or a radially inward direction are constructed integrally with the checker body 85 on opposite widthwise ends. Furthermore, the checker body 85 is provided integrally with circumferential movement preventive juts 95, 95 around one longitudinal end and the other longitudinal end of the flat portion 91. The circumferential movement preventive jut 95, 95 protrude or jut in one axial side and an opposite axial side, (namely, in one and an opposite axial directions of the quick connector 1, the connector housing 3 or the retainer holding portion 11) respectively. A circumferential distance between the circumferential movement preventive jut 95 of one circumferential side and the circumferential movement preventive jut 95 of the other circumferential side, i.e., a space between the circumferential movement preventive juts 95, 95 on the same axial side is designated generally identical to a length of the elongate rib 47.

Figure 6:
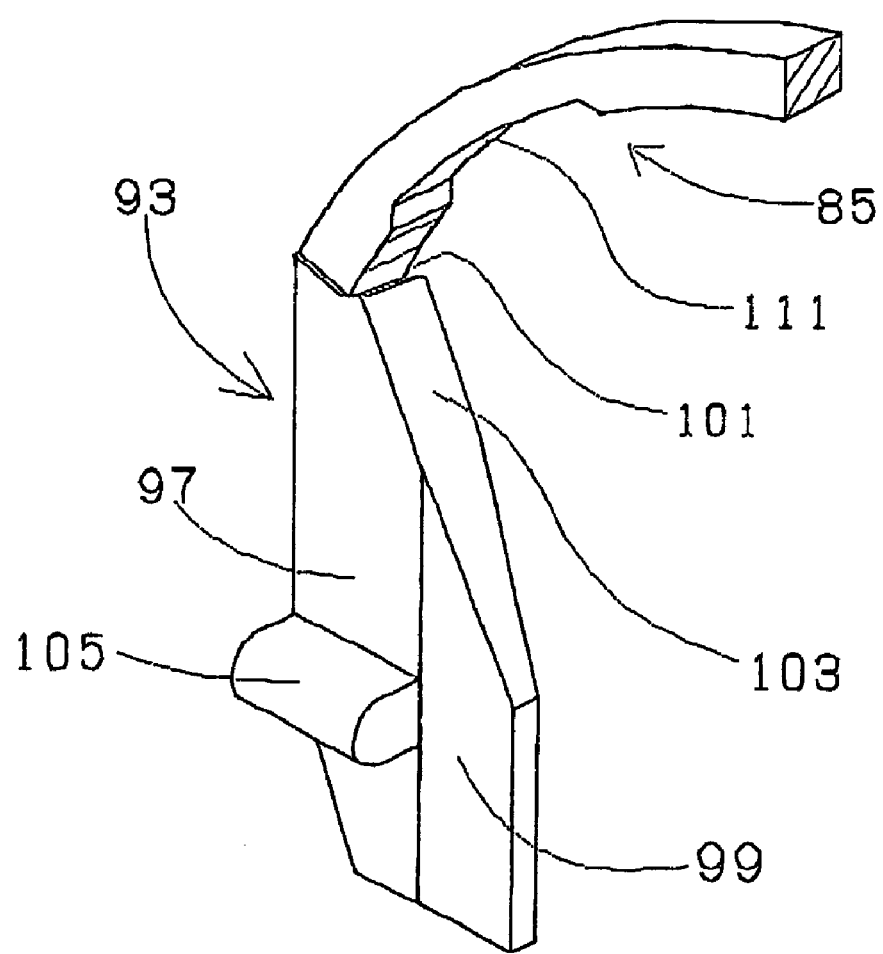
FIG. 6 is an enlarged view of a portion of an inwardly directed engagement portion of a checker.

Each inwardly directed engagement portion 93 integrally comprises base portion 97 widthwise or radially outside, and push-out portion 99 widthwise or radially inside. Each base portion 97 is formed with wall somewhat thicker than the checker body 85, in integrally connecting relation with a respective one of the opposite ends of the checker body 85. Each push-out portion 99 includes both side surfaces in a direction of thickness thereof or in an axial direction (namely, in an axial direction of the quick connector 1, the connector housing 3 or the retainer holding portion 11) which are symmetrically gently inclined so as to be gradually thinner radially inwardly. A widthwise or radially inner end of the push-out portions 99 extends in a direction perpendicular to the direction of the flat portion 91 extending. Each of the base portions 97, 97 includes a short stop engagement surface 101 as a stopper or a locking portion (refer to FIG. 6) inside or radially inside of a root position thereof (a position bordering the checker body 85 and the base portion 97) being somewhat ramped toward inward or radially inward direction in a pull-out direction (in a direction of the flat portion 91: in a direction shown by an arrow in FIG. 9). That is, the short stop engagement surfaces 101, 101 are ramped inwardly upwards in FIGS. 1 and 5. Each inwardly directed engagement portion 93 includes retaining surface 103 ramped toward a fit-on direction (refer to a vertical arrow in FIG. 1) inwardly or radially inwardly and extending from inner or radially inner end of the short stop engagement surface 101 toward inner or radially inner end of a respective push-out portion 99. Widthwise or radially outward portion of each retaining surface 103 is defined by the base portion 97 while widthwise or radially inner portion thereof is defined by the push-out portion 99.

The base portions 97, 97 of the checker 7 are formed integrally with checker juts 105, 105 on one side surface and an opposite side surface in a thickness or an axial direction. The checker juts 105, 105 protrude or jut in an axial direction and are located rather toward the opposite side of the checker body 85 on the base portions 97, 97 respectively. Each checker jut 105 is relatively thin-walled, and extends entire width of the base portion 97, from a radially inner end to a radially outer end thereof. The tip end portion of the checker jut 105 is shaped like semicircle in cross-section. The checker jut 105 is designed to jut generally for the axial distance from one axial end of the retainer 5 to one axial end of the engagement slit 73, or generally for the axial distance between an opposite axial side surface of the elongate rib 47 of one axial side and the one axial end 49 of the engagement window 43.

Figure 7:
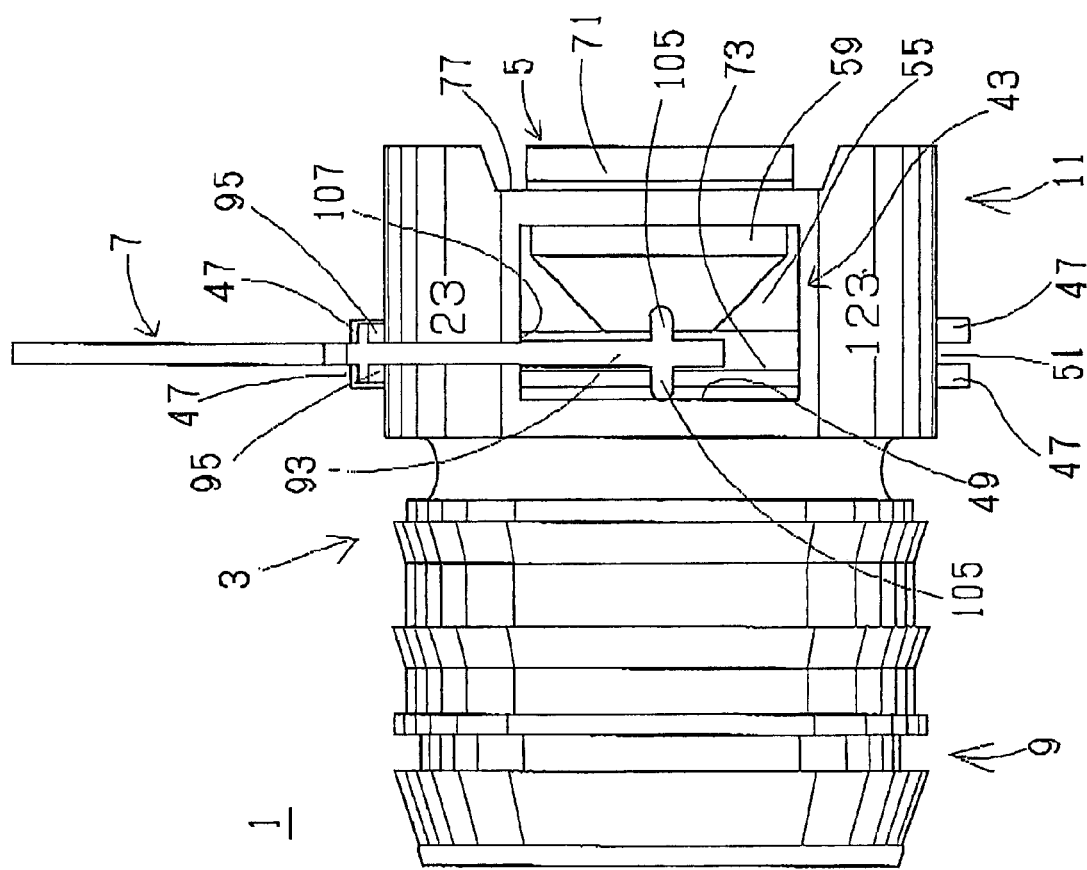
FIG. 7 is a front view of the quick connector according to the present invention.
Figure 8:
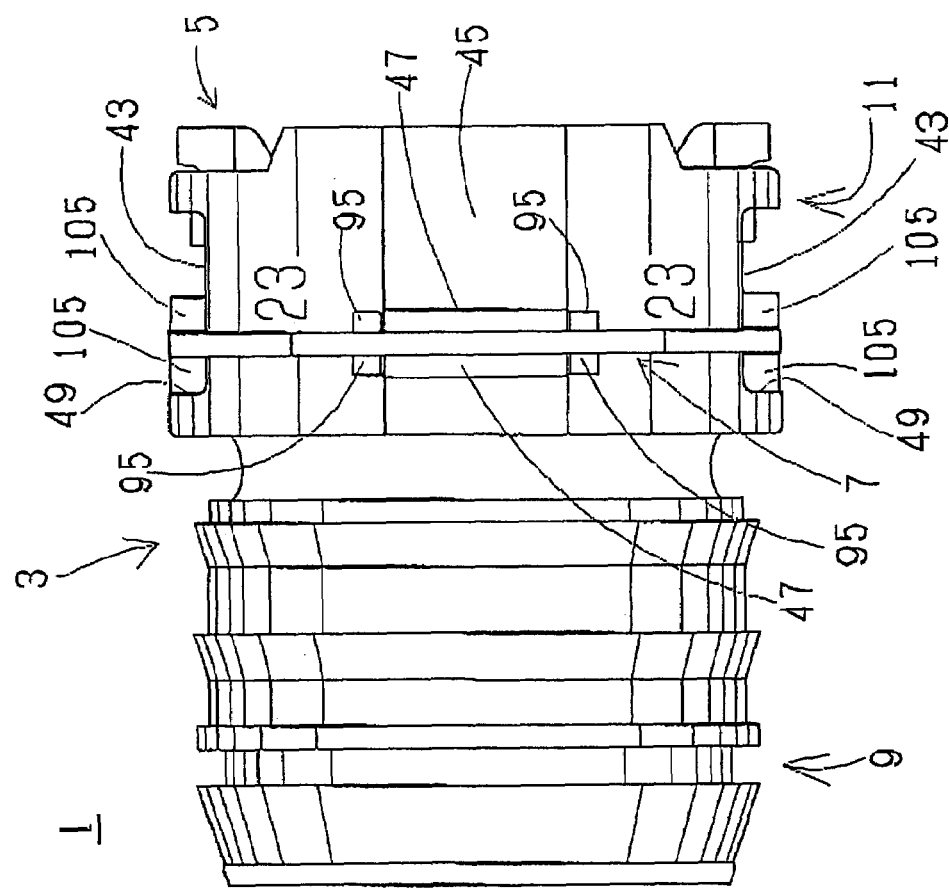
FIG. 8 is a plan view of the quick connector according to the present invention.

Thus configured checker 7 is fitted or mounted along an outer peripheral surface of the connector housing 3 or embracing an outer peripheral surface of the connector housing 3 in contacting relation entirely therewith, so that the position of the flat portion 91 fits in the fit-in slot 51 defined by the elongate ribs 47, 47 on the flat region 45 of the connector housing 3 in contact with the flat region 45, each of the elongate ribs 47, 47 fits between the circumferential movement preventive juts 95, 95 or the circumferential movement preventive juts 95, 95 hold each of the elongate rib 47, 47 therebetween, each of the inwardly directed engagement portions 93, 93 enters in the engagement window 43, and each of the short stop engagement surface 101 (here inner end portion, radially inner end portion or radially inner end of the short stop engagement surface 101) engages with one circumferential end 113 of the engagement window 43. In this mounting state, each checker jut 105 formed on the base portion 97 of the checker 7 abuts or contacts with one axial end 49 of the engagement window 43 and the annular end surface 53 (refer also to FIGS. 7 and 8). The checker 7 is not pulled out of the connector housing 3 due to engagement or locking engagement between the short engagement stop surfaces 101, 101 and the one circumferential ends 107, 107 of the engagement windows 43, 43 even if the pull-ring 87 is pulled in a pull-out direction (a vertically outward direction from the flat region 45). And, the checker 7 does not move circumferentially due to abutment relation between the circumferential movement preventive juts 95, 95 and the elongate rib 47, even if the checker 7 is touched by something such as a finger of an operator.

Figure 3:
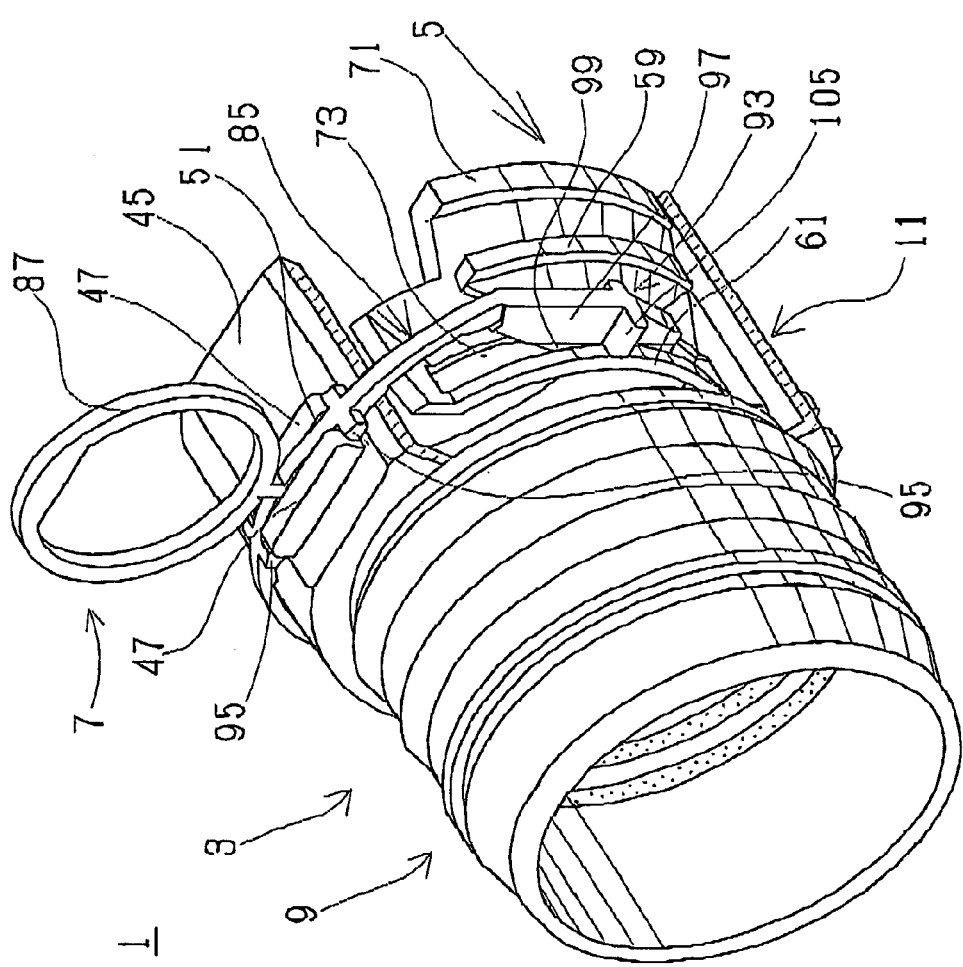
FIG. 3 is a partly-broken, perspective view of the quick connector according to the present invention.

The checker 7 is being fitted on the connector housing 3 by sliding the inwardly directed engagement portions 93, 93 over an outer peripheral surface of the connector housing 3 toward the engagement windows 43, 43 respectively. As the inwardly directed engagement portions 93, 93 are progressively slid over an outer peripheral surface of the connector housing 3, the checker body 85 is resiliently deformed in an opening direction. On reaching the engagement windows 43, 43, the inwardly directed engagement portions 93, 93 enter therein respectively under spring back force of the checker body 85, resulting snap-engagement between the short stop engagement surfaces 101, 101 and the one circumferential ends 107, 107 of the engagement windows 43, 43. Referring specifically to FIGS. 3 and 5, the radially inner ends of the inwardly directed engagement portions 93, 93 or of the push-out portions 99, 99 seat in the engagement slits 73, 73 of the retainer 5 through the engagement windows, 43, 43, and a distance between radially inner ends of the inwardly directed engagement portions 93, 93 or of the push-out portions 99, 99 is generally identical to an outer diameter of the pipe 63. Further, as a distance between the elongate ribs 47, 47, namely width of the fit-in slot 51 is designed generally identical to thickness of a position of the flat portion 91 of the checker body 85, the checker 7 is hardly inclined, for example, if the pull-ring 87 is pulled in an axially inclining direction. The checker 7 can be fitted on the connector housing 3 likewise from either side of one flat region 45 or the other flat region 45. Furthermore, the checker 7 is configured so as to fit on the connector housing 3 similarly either with a surface of one side or a surface of an opposite side toward one axial side, in bi-directional manner.

And, as well seen in FIGS. 1 and 5, a cut-away 109 is formed in the pull-ring 87 outside around a root portion thereof. The cut-away 109 allows the pull-ring 87 to break when the checker 7 is pulled by force. That prevents the checker 7 from being pulled out, when the pipe 63 is incompletely connected with the quick connector 1 and the checker 7 is pulled by strong force. Further, as well seen in FIGS. 2 and 5, the checker body 85 is provided with recessed portions 111, 111 on opposite widthwise sides of an inner surface thereof to receive a raised type number 113 formed in relief on an outer peripheral surface of the connector housing 3 therein, thereby preventing the checker 7 from loosing off an outer peripheral surface of the connector housing 3. Meanwhile, numeral reference 115 in FIGS. 4 and 5 shows a rotation preventive projection seating in the indent 67 of the main body 55 of the retainer 5 to restrain rotational movement of the retainer 5. Further, a rotation preventive projection 117 (refer to FIG. 5) of the same configuration as the rotation preventive projection 115 is formed in diametrically symmetrical position, so that the retainer 5 in rotating 180° from its position in FIG. 1 can be fitted in the retainer holding portion 11 likewise.

Figure 9:
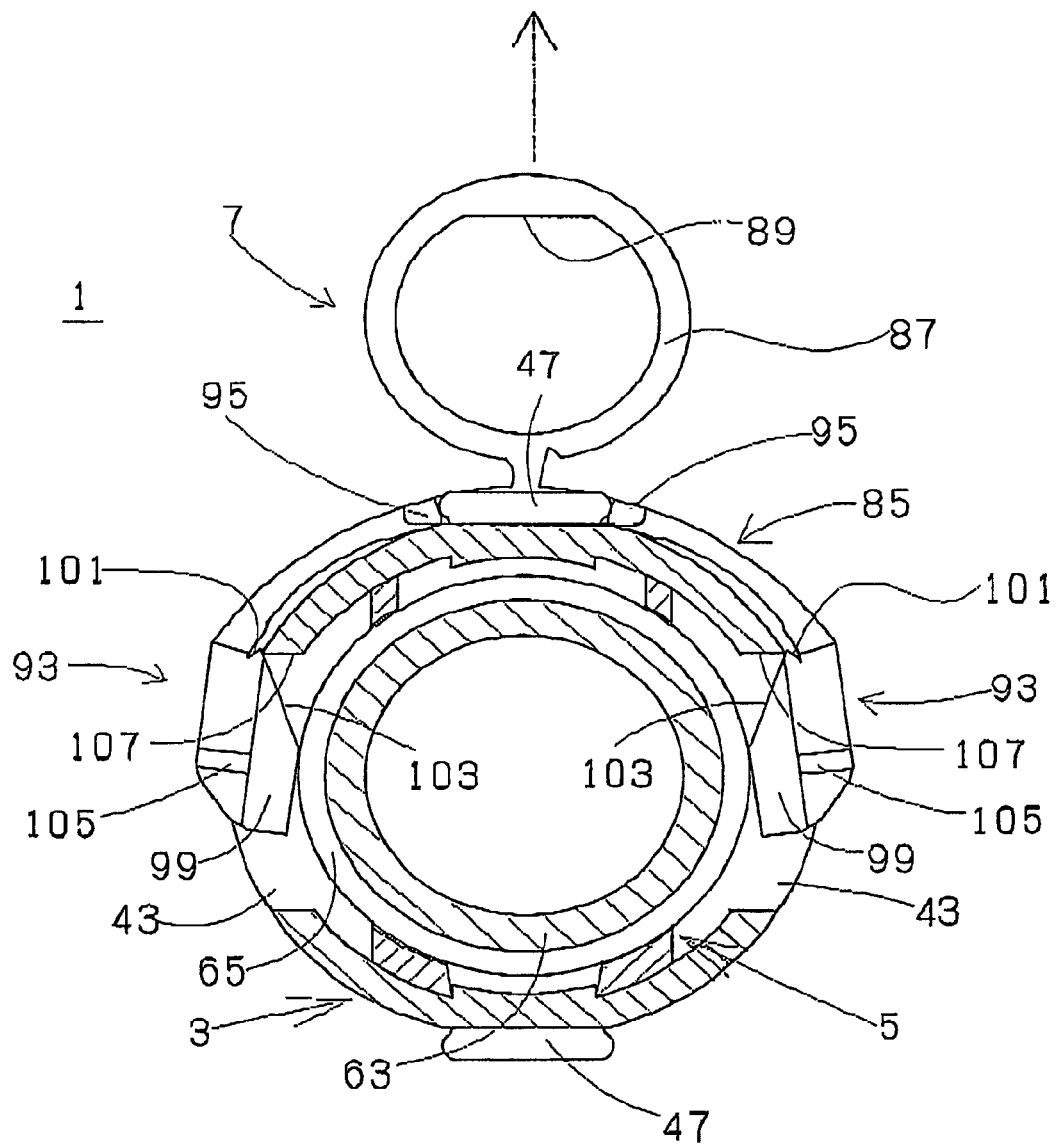
FIG. 9 is a sectional view taken in a radial direction showing the quick connector according to the present invention wherein a pipe is inserted.
Figure 10:
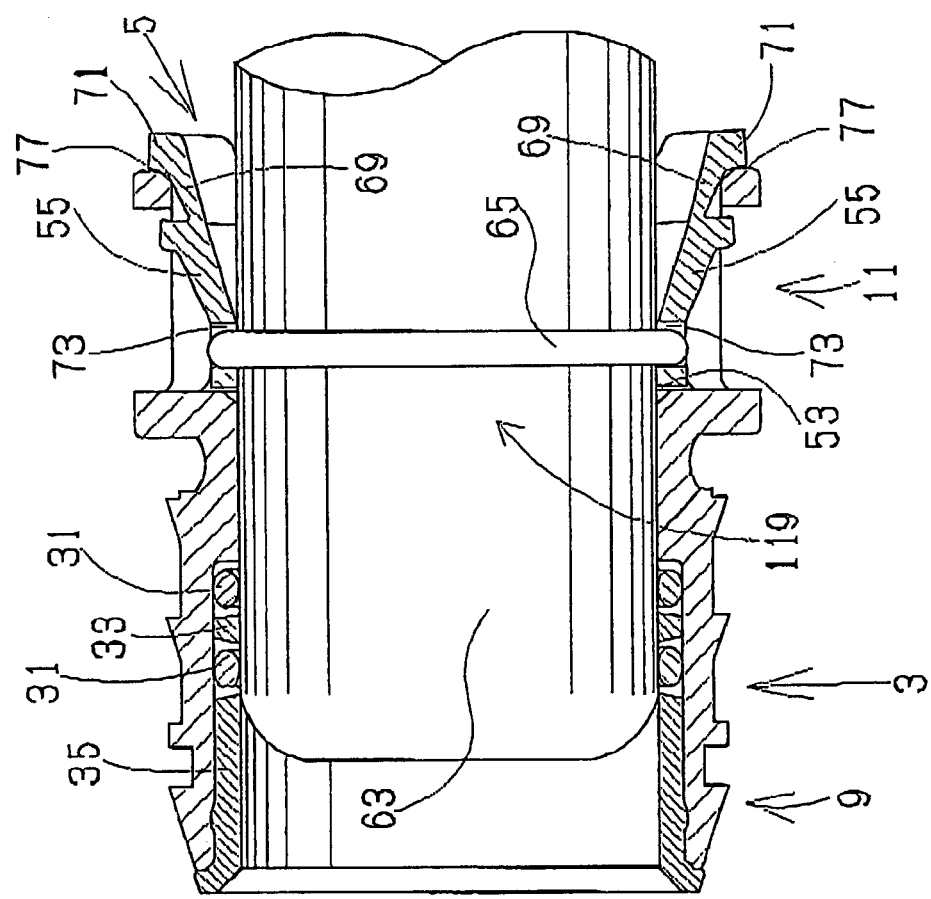
FIG. 10 is a sectional view taken in an axial direction showing a quick connector according to the present invention wherein the pipe is inserted and then the checker is pulled out.

As well shown in FIGS. 9 and 10, the pipe 63, for example to be joined with the tube, which is made of metal, is inserted in the quick connector 1 from an opening on an opposite axial end of the retainer holding portion 11, more specifically, in the main body 55 of the retainer 5 from a side of the latching ends 71, 71 of the operation arms 69, 69, and is to be fitted in the quick connector 1. The pipe 63 has an inserting end portion 119 wherein the annular engagement projection 65 is formed on an outer peripheral surface, at one axial end side thereof. The pipe 63 is pushed, and fittingly inserted into the quick connector 1 or connector housing 3 so that the annular engagement projection 65 progresses radially expanding inner surface of the main body 55 of the retainer 5 until the annular engagement projection 65 seats in the engagement slits 73, 73 in snap-engagement relation therewith. The annular engagement projection 65 which has fitted and snap-engaged in the engagement slits 73, 73 of the main body 55 of the retainer 5 blocks or limits further axial in-and-out movement of the pipe 63 with respect to the quick connector 1. That is, the pipe 63 is thereby almost locked against relative axial movement in the quick connector 1. One axial end or inserting end of the pipe 63 reaches in the resin bush 35 fitted in the resin tube connecting portion 9 beyond a pair of the O-rings 31, 31 provided in the resin tube connecting portion 9 and thereby a seal is formed by the O-rings 31, 31 between an outer periphery surface of the pipe 63 and an inner periphery surface of the quick connector 1. The retainer 5 is usually fitted slightly loosely in the retainer holding portion 11 with slight axial play therein. However, at least when the pipe 63 is fully inserted therein, one axial end of the main body 55 is located close to the annular end surface 53 and each of the latching ends 71, 71 is in abutment relation with respect to the respective receiving recessed portion 77. An inner diameter of the small diameter portion 29 of the resin tube connecting portion 9 and an inner diameter of the resin bush 35 are designed generally identical to an outer diameter of the pipe 63.

When an inserting end portion 119 of the pipe 63 is inserted in the main body 55 of the retainer 5 and the annular engagement projection 65 of the pipe 63 reaches a position of opposite axial ends of the engagement slits 73, 73 the annular engagement projection 65 abuts radially inner end portions of the inwardly directed engagement portions 93, 93 or push-out portions 99, 99 of the checker 7 which projects inside of the main body 55 through the engagement slits 73, 73 of the retainer 5 as a result that the main body 55 of the retainer 5 is expanded by the annular engagement projection 65. When the inserting end portion 119 of the pipe 63 has been further inserted, the annular engagement projection 65 is pushing back the inwardly directed engagement portions 93, 93 or push-out portions 99, 99, radially outwardly, and progresses up to a position axially corresponding to the engagement slits 73, 73. As opposite axial side surfaces of radially inner end portions of the inwardly directed engagement portions 93, 93 or of the push-out portions 99, 99, which the annular engagement projection 65 abuts, are inclined toward an inward, or radially inward direction in one axial direction, although slightly. And the inwardly directed engagement portions 93, 93 are prevented from deformation and displacement in one axial direction because the checker juts 105, 105 of the base portions 97, 97 toward one axial direction abut the one axial ends 49, 49 of the engagement windows 43, 43 respectively. The inwardly directed engagement portions 93, 93 are thereby smoothly guided, deformed and displaced radially outwardly due to abutment with the annular engagement projection 65. When the annular engagement projection 65 reaches a position axially corresponding to the engagement slits 73, 73, the one axial end portion 61 of the main body 55 of the retainer 5 which is expanded springs back to its original, or generally original dimension, and the annular engagement projection 65 seats and engages in the engagement slits 73, 73 of the main body 55. On the other hand, the inwardly directed engagement portions 93, 93 of the checker 7 are held to be deformed and displaced radially outwardly in abutment relation with the annular engagement projection 65 or portions surrounding the engagement slits 73, 73. In this state, locking engagement relations between the short stop engagement surfaces 101, 101 of the inwardly directed engagement portions 93, 93 and the one circumferential ends 107, 107 of the engagement windows 43, 43 are released.

Figure 11:
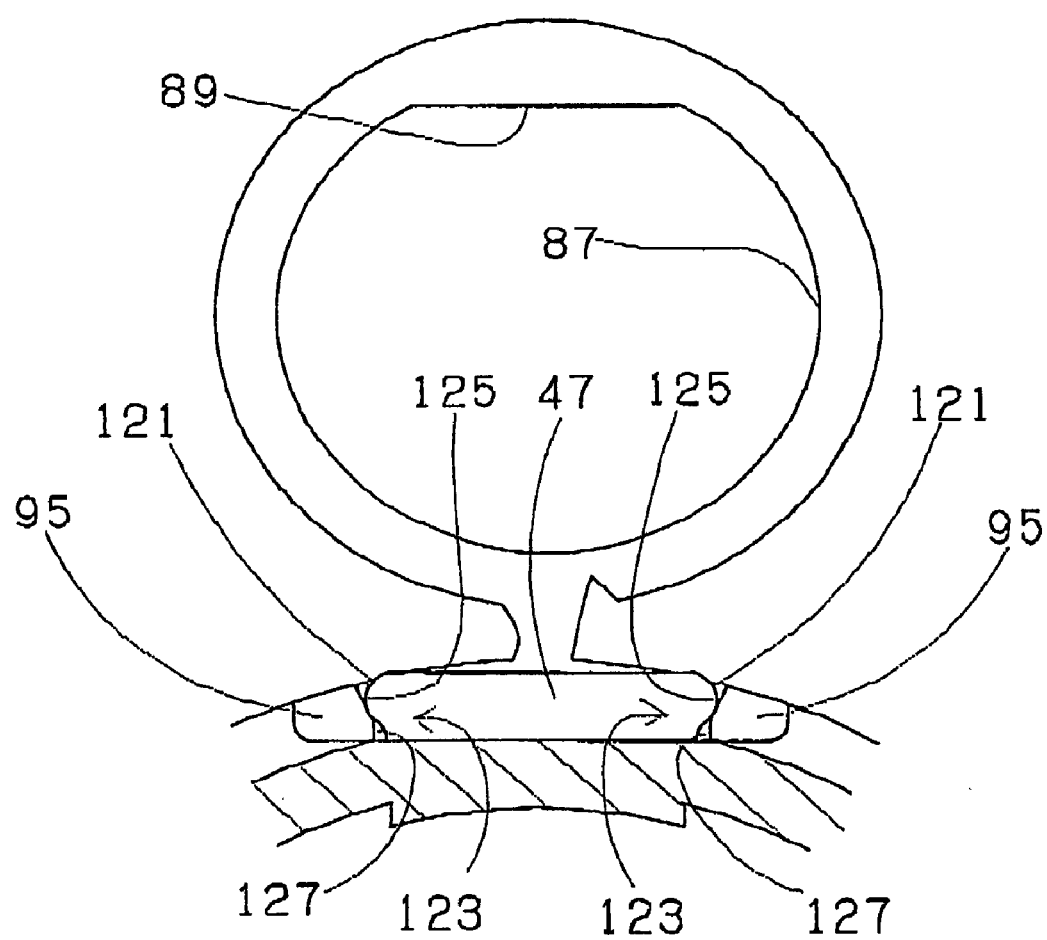
FIG. 11 is a view showing engagement relation between an elongate rib and a circumferential movement preventive jut.

As shown in FIG. 11, the elongate rib 47 is provided with one circumferential end surface and the other circumferential end surface 121, 121 of curved shape protruding outwardly at mid-portion in height thereof respectively, while the circumferential movement preventive jut 95 of generally or substantially rectangular in cross-section is provided with a circumferentially inner surface 123 which includes a beveled surface portion 125 beveled from an outer end toward an inner end, circumferentially inwardly to the position near the inner end, and a vertical surface portion 127 extending in a fit-in direction on inner side of the beveled surface portion 125. A circumferential distance between the circumferential movement preventive jut 95 of one circumferential side and the circumferential movement preventive jut 95 of the other circumferential side is designed generally identical to the length of the elongate rib 47. Therefore, when the checker 7 is fitted on the connector housing 3, the beveled surface portion 125 of the circumferentially inner surface 123 of the circumferential movement preventive jut 95 snap-engages with an under part of the respective circumferential end surface 121 of the elongate rib 47. That is, as the circumferential movement preventive jut 95 engage with the elongate rib 47 in a pull-out direction in this state, the checker 7 never comes out of the connector housing 3 and falls off easily. Even if the circumferential movement preventive jut 95 comes out of the elongate rib 47 when touched by a finger of an operator or the like, as the retaining surfaces 103, 103 of the inwardly directed engagement portions 93, 93 are still held or pressed against the one circumferential ends 107, 107 of the engagement windows 43, 43, it is prevented that the checker 7 comes out of the connector housing 3 and falls off as it is.

In this state, when the pull-ring 87 is pulled in a pull-out direction (refer to an arrow in FIG. 9), engagement between the circumferential movement preventive jut 95 and the elongate rib 47 is released. The retaining surfaces 103, 103 which are formed in tapered configuration so as to incline gently radially inwardly, exhibit poor retaining function. That means, the checker 7 is pulled out quite easily. By pull-out of the checker 7, it can be verified that the annular engagement projection 65 is engaged in the engagement slits 73, 73 and thereby the pipe 63 is connected with the quick connector 1 correctly.

In the event of removing the pipe 63 from the quick connector 1, the latching ends 71, 71 of the operation arms 69, 69 received in the receiving recessed portions 77, 77 are pressed radially inwardly from outside to narrow a radial space between the operation arms 69, 69, thus a radial space between the engagement tabs 59, 59. And, thereby the engagement tabs 59, 59 are out of the engagement windows 43, 43, and the retainer 5 can be relatively pulled out of the connector housing 3. As the retainer 5 is relatively pulled out of the connector housing 3, the pipe 63 will have been also pulled out of the quick connector 1 or the connector housing 3 along with the retainer 5.

Figure 12:
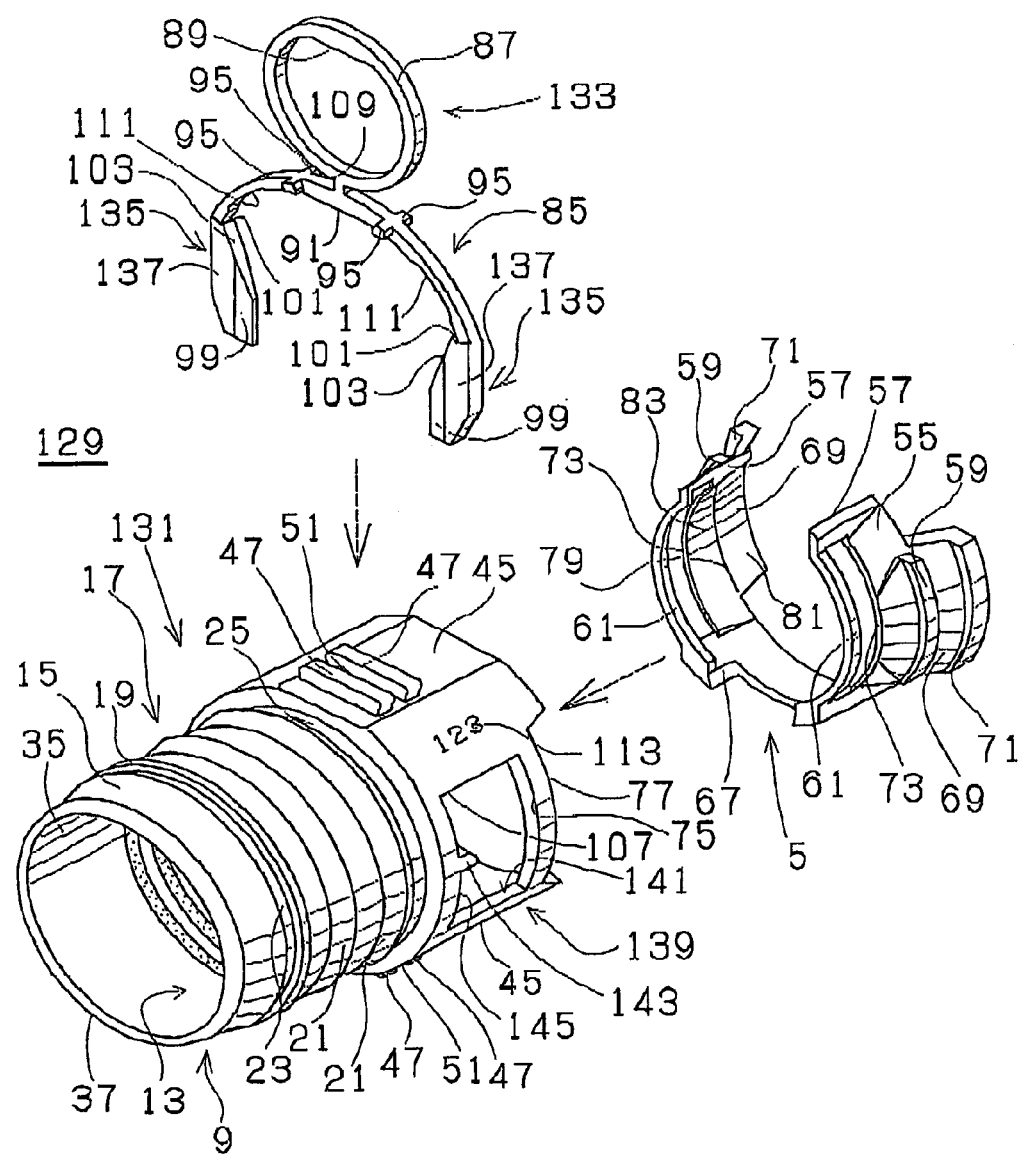
FIG. 12 is an exploded perspective view of a quick connector with another configuration according to the present invention.
Figure 13:
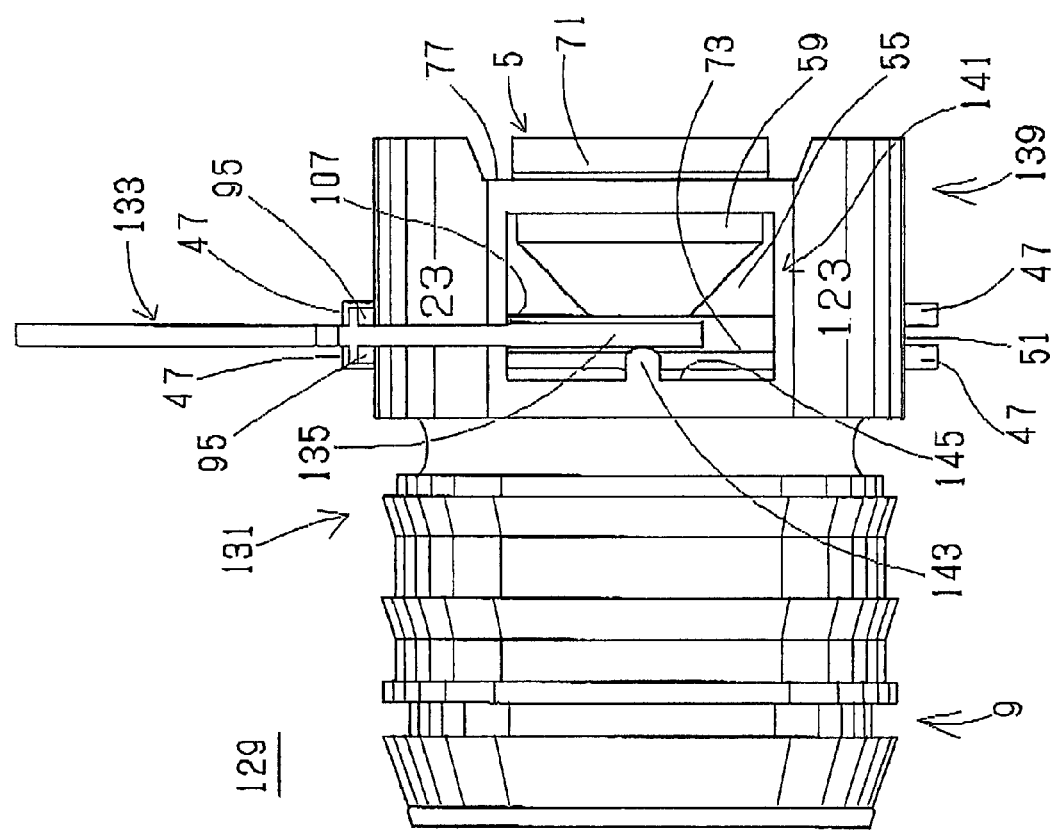
FIG. 13 is a front view of the quick connector with another configuration according to the present invention.
Figure 14:
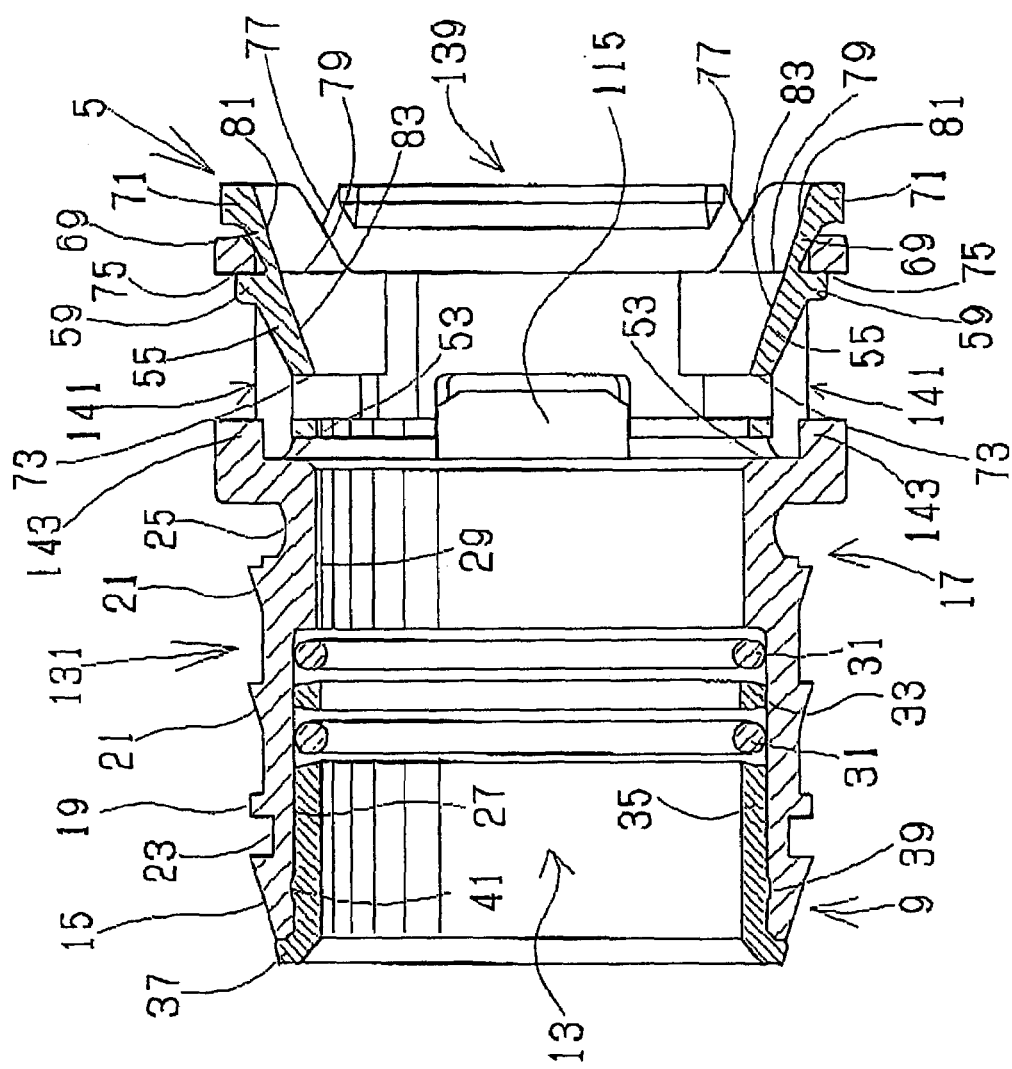
FIG. 14 is a sectional view taken in an axial direction of the quick connector with another configuration according to the present invention.

FIGS. 12, 13 and 14 show a quick connector 129 of another configuration with function of verifying complete connection. The quick connector 129 of another configuration with verifying complete connection, which is also adapted in assembly in a gasoline fuel piping of an automobile, comprises a tubular connector housing 131, a generally annular retainer 5 and a checker 133 for verifying complete connection. The quick connector 129 of another configuration is configured by modifying structures of inclining preventive means constructed on the quick connector 1 with function of verifying complete connection to prevent the inwardly directed engagement portion 93 of the checker 7 from inclining in one axial direction. Therefore, as to portions of configuration identical to the quick connector 1, identical numeral references almost are given and explanations are almost omitted herein.

The checker 133 which is applied for the quick connector 129 is provided with inwardly directed engagement portions 135, 135. The inwardly directed engagement portions 135, 135 have integrally base portions 137, 137 shaped of simple chip or plate chip, configured by omission of the checker jut 105 in the base portion 97 of the checker 7. The retainer holding portion 139 of the connector housing 131 of the quick connector 129 is provided with engagement windows 141, 141. The engagement windows 141, 141 are provided with window juts 143, 143 protruding or jutting in an opposite axial direction respectively on one axial ends 145, 145 thereof, and are configured by forming the window jut 143 integrally with the one axial end 49 of the engagement window 43 of the retainer holding portion 11.

Each window jut 143 is relatively thin-walled and is provided integrally on a circumferential midportion of the one axial end 145 of the engagement window 141. The window jut 143 is formed, for example, to extend from a radially inner end to a radially outer end of one axial end 145 of the engagement window 141, and along entire width of the one axial end or one axial end surface 145. A tip end portion of the window jut 143 is formed in generally semicircle in cross-section. However, the window jut 143 may be formed on the one axial end 145 of the engagement window 141 with discretional width or in discretional shape. Also the window jut 143 protrudes or juts identical in length to an axial distance from one axial end of the retainer 5 to one axial end of the engagement slit 73, or extends generally to an axial position of an opposite axial side surface of the elongate rib 47 of one axial side. Therefore, when the checker 133 is fitted on the connector housing 131, the window juts 143, 143 abut or contact with the base portions 137, 137 constituting the inwardly directed engagement portions 135, 135 of the checker 133.

Figure 15:
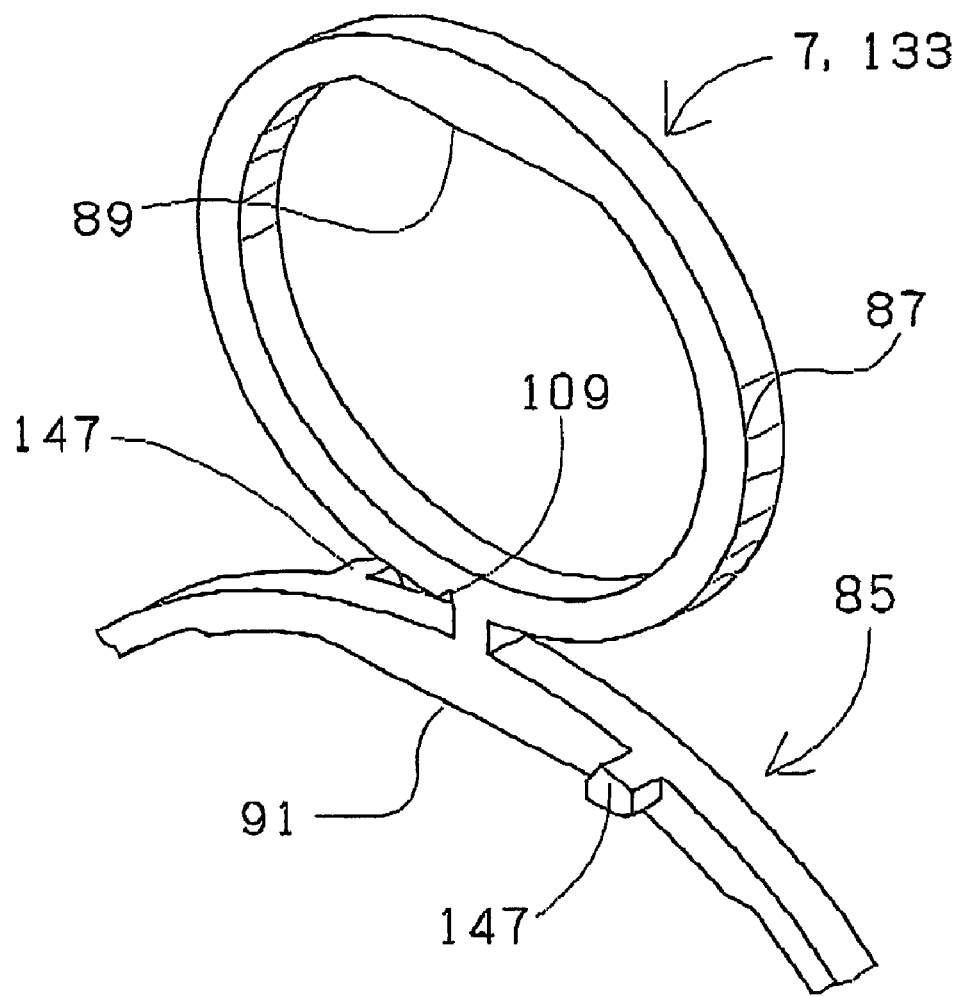
FIG. 15 is a view showing another configuration of a structure of a circumferential movement preventive jut.

FIG. 15 shows another structure of circumferential movement preventive juts. In this instance, the checker body 85 is provided with a circumferential movement preventive jut 147 jutting in one axial direction nearly on one longitudinal end of the flat portion 91 and a circumferential movement preventive jut 147 jutting in an opposite axial direction nearly on the other longitudinal end thereof. The circumferential movement preventive juts 147, 147 are identical in construction to the circumferential movement preventive juts 95, 95. That is, another structure with circumferential movement preventive juts 147, 147 is configured by omission of the circumferential movement preventive jut 95 jutting in an opposite axial direction nearly on one longitudinal end of the flat portion 91 and the circumferential movement preventive jut 95 jutting in one axial direction nearly on the other longitudinal end thereof in the structure with the circumferential movement preventive juts 95, 95. If circumferential movement preventive juts jutting in one and an opposite axial sides are provided respectively nearly on opposite longitudinal ends of the flat portion 91, a function is enhanced to retain the checker 7, 133 in the fit-in slot 51 defined between the elongate ribs 47, 47. However, on the other hand, when external force is exerted circumferentially onto the checker 7, 133, the circumferential movement preventive juts are pressed against the elongate ribs 47, 47 on opposite axial sides of the checker body 85. Then, there is a fear that a rotational force acts on the checker body 85 about the circumferential movement preventive juts in a direction perpendicular to an axis, the inwardly directed engagement portions 93, 135 move in a direction of escaping from the engagement windows 43, 141, and thereby engagement between the checker 7, 133 and the connector housing 3, 131 is released. However, if the structure with the circumferential movement preventive juts 147, 147 is adopted, when external force is exerted circumferentially on the checker 7, 133, the circumferential movement preventive jut 147 is pressed against the elongate rib 47 on either of one or an opposite axial side of the checker body 85. Therefore, a rotational force acting on the checker body 85 about the circumferential movement preventive jut 147 inclines in an axial direction, and for example, twists the checker body 85 in an axial direction. Consequently, it is effectively prevented that the inwardly directed engagement portions 93, 135 move in a direction perpendicular to an axis and slip out of the engagement windows 43, 141 easily.

We claim:

1. A quick connector to be connected with a pipe including an inserting end portion provided with an annular engagement projection, and having a function to verify complete connection with the pipe, comprising:

a tubular connector housing provided with a tube connecting portion on one axial side thereof and a retainer holding portion having at least one engagement window on an opposite axial side of the connector housing, a generally annular retainer provided with a pipe engagement portion adapted to be snap-engaged with the annular engagement projection of the pipe, and fitted to the retainer holding portion to engage with the engagement window, the retainer being fitted in the retainer holding portion so that the pipe engagement portion is located on one side of one axial end of the engagement window and shown in the engagement window, a checker having a checker body configured so as to be generally along an outer peripheral surface of the connector housing and provided with a pull-out portion, and at least one window engagement portion formed integrally on the checker body, the checker being fitted or mounted on an outer periphery or outer peripheral surface of the connector housing in locking relation in a pull-out direction by engagement between the window engagement portion and the engagement window, the window engagement portion of the checker being configured so as to be pushed by the annular engagement projection of the pipe, and thereby deformed and moved to allow the checker to be pulled out when snap-engagement between the annular engagement projection and the pipe engagement portion of the retainer brings about complete connection between the pipe and the quick connector, the window engagement portion seating in the engagement window in an axial position corresponding to the pipe engagement portion of the retainer, the retainer holding portion including an annular end surface on one axial side of the inside thereof, the annular end surface being positioned axially such that one axial end of the retainer cannot be located on the opposite side of the one axial end of the engagement window, and inclining preventive means provided between the window engagement portion of the checker and the one axial end of the engagement window to prevent the window engagement portion from inclining in one axial direction, and the inclining preventive means being a circumferentially thin-walled checker jut jutting in an axial direction provided integrally on a mid portion in a circumferential position on the window engagement portion of the checker.

2. A quick connector to be connected with a pipe including an inserting end portion provided with an annular engagement projection, and having a function to verify complete connection with the pipe, comprising:

a tubular connector housing provided with a tube connecting portion on one axial side thereof and a retainer holding portion having at least one engagement window on an opposite axial side of the connector housing, a generally annular retainer provided with a pipe engagement portion adapted to be snap-engaged with the annular engagement projection of the pipe, and fitted to the retainer holding portion to engage with the engagement window, the retainer being fitted in the retainer holding portion so that the pipe engagement portion is located on one side of one axial end of the engagement window and shown in the engagement window, a checker having a checker body configured so as to be generally along an outer peripheral surface of the connector housing and provided with a pull-out portion, and at least one window engagement portion formed integrally on the checker body, the checker being fitted or mounted on an outer periphery or outer peripheral surface of the connector housing in locking relation in a pull-out direction by engagement between the window engagement portion and the engagement window, the window engagement portion of the checker being configured so as to be pushed by the annular engagement projection of the pipe, and thereby deformed and moved to allow the checker to be pulled out when snap-engagement between the annular engagement projection and the pipe engagement portion of the retainer brings about complete connection between the pipe and the quick connector, the window engagement portion seating in the engagement window in an axial position corresponding to the pipe engagement portion of the retainer, the retainer holding portion including an annular end surface on one axial side of the inside thereof, the annular end surface being positioned axially such that one axial end of the retainer cannot be located on the opposite side of the one axial end of the engagement window, and inclining preventive means provided between the window engagement portion of the checker and the one axial end of the engagement window to prevent the window engagement portion from inclining in one axial direction, the inclining preventive means being a circumferentially thin-walled checker jut jutting in an axial direction with such axial length so as to contact the window engagement portion of the checker mounted on an outer side of the connector housing, and said checker jut provided integrally on a portion in a circumferential position on the one axial end of the engagement window.

3. A quick connector to be connected with a pipe including an inserting end portion provided with an annular engagement projection, and having a function to verify complete connection with the pipe, comprising:

a tubular connector housing provided with a tube connecting portion on one axial side thereof and a retainer holding portion having at least one engagement window on an opposite axial side of the connector housing, a generally annular retainer provided with a pipe engagement portion adapted to be snap-engaged with the annular engagement projection of the pipe, and fitted to the retainer holding portion to engage with the engagement window, the retainer being fitted in the retainer holding portion so that the pipe engagement portion is located on one side of one axial end of the engagement window and shown in the engagement window, a checker having a checker body configured so as to be generally along an outer peripheral surface of the connector housing and provided with a pull-out por tion, and at least one window engagement portion formed integrally on the checker body, the checker being fitted or mounted on an outer periphery or outer peripheral surface of the connector housing in locking relation in a pull-out direction by engagement between the window engagement portion and the engagement window, the window engagement portion of the checker being configured so as to be pushed by the annular engagement projection of the pipe, and thereby deformed and moved to allow the checker to be pulled out when snap-engagement between the annular engagement projection and the pipe engagement portion of the retainer brings about complete connection between the pipe and the quick connector, the window engagement portion seating in the engagement window in an axial position corresponding to the pipe engagement portion of the retainer, the retainer holding portion including an annular end surface on one axial side of the inside thereof, the annular end surface being positioned axially such that one axial end of the retainer cannot be located on the opposite side of the one axial end of the engagement window, and inclining preventive means provided between the window engagement portion of the checker and the one axial end of the engagement window to prevent the window engagement portion from inclining in one axial direction, the inclining preventive means being a circumferentially thin-walled checker jut jutting in an axial direction provided integrally on a portion in a circumferential position on the window engagement portion of the checker, and the checker jut including a tip end portion having a generally semicircular cross-section.

* * * * *